United States Patent [19]

Hobelsberger

[11] Patent Number: 5,757,676
[45] Date of Patent: May 26, 1998

[54] METHOD FOR MEASURING SPEED

[75] Inventor: Max Hobelsberger, Wurenlingen, Switzerland

[73] Assignee: Asea Brown Boveri AG, Baden, Switzerland

[21] Appl. No.: 718,708

[22] Filed: Sep. 27, 1996

[30] Foreign Application Priority Data

Oct. 2, 1995 [DE] Germany ............ 195 36 840.1

[51] Int. Cl.$^6$ ..................................... G01P 3/00
[52] U.S. Cl. .............. 364/565; 73/514.39; 324/160; 324/167; 324/179
[58] Field of Search .................. 364/565; 324/160, 324/167, 179; 73/66, 514.39

[56] References Cited

U.S. PATENT DOCUMENTS

| | | | |
|---|---|---|---|
| 4,506,339 | 3/1985 | Kuhnlein | 364/565 |
| 4,569,027 | 2/1986 | Nakano et al. | 364/565 |
| 4,799,178 | 1/1989 | Spadafora et al. | 364/565 |
| 4,811,232 | 3/1989 | Hoashi et al. | 364/426.02 |
| 4,885,710 | 12/1989 | Hersberger et al. | 364/565 |
| 4,977,525 | 12/1990 | Blackwell | 364/565 |

FOREIGN PATENT DOCUMENTS

| | | |
|---|---|---|
| 2801520 | 7/1979 | Germany. |
| 3446611A1 | 7/1985 | Germany. |
| 3821938A1 | 1/1990 | Germany. |
| 60-47964(A) | 3/1985 | Japan. |

OTHER PUBLICATIONS

Bonert, "Design of a High Performance Digital Tachometer with a Microcontroller", IEEE 1989.

*Primary Examiner*—James P. Trammell
*Assistant Examiner*—Patrick Assouad
*Attorney, Agent, or Firm*—Burns, Doane, Swecker & Mathis, L.L.P.

[57] ABSTRACT

A method for measuring rotational speed in which a plurality of signal sources disposed along the periphery of a rotating system is monitored by a sensor, and the signals generated by the sensor are added by a counter to form a speed signal sum N. An associated time reference value $A_N$ is determined for each speed signal sum N, and the speed signal sum N and the time reference value $A_N$ for each signal source are saved in pairs in a storage medium. To determine the rotational speed, the time reference value $A_{N-M}$ which had been saved exactly one revolution before along with the speed signal sum N-M is then retrieved from the storage medium by a processor, which determines the difference of the time reference values $A_N$ and $A_{N-M}$ (the revolution time for one revolution of the rotating system), and then determines the reciprocal value of the revolution time, which represents the speed.

13 Claims, 1 Drawing Sheet

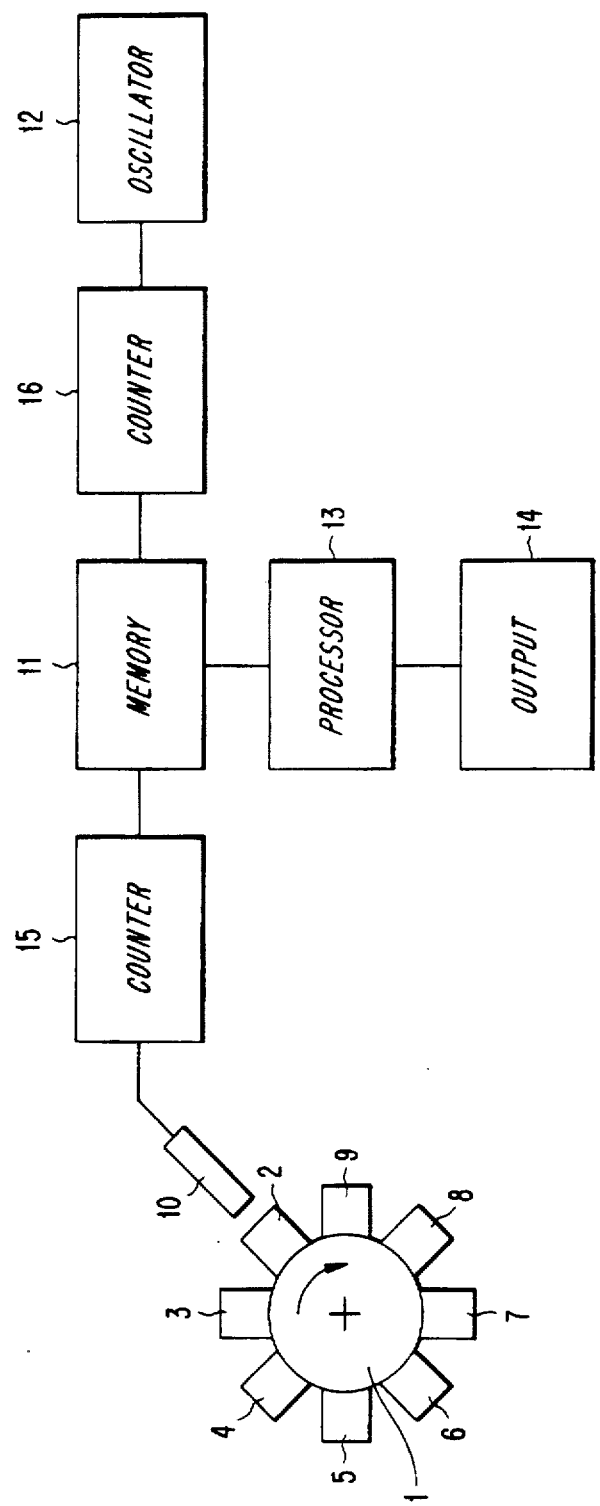

METHOD FOR MEASURING SPEED

FIELD OF THE INVENTION

The present invention relates to a method for measuring rotational speed; more particularly, the present invention provides a method for measuring rotational speed by monitoring signal sources disposed on a rotating element, in which processing time is reduced.

BACKGROUND OF THE INVENTION

Many methods for measuring speed are known. The measurement of speed, in accordance with the definition of velocity or angular velocity, is performed by determining a distance in relation to time. Thus, a velocity or angular velocity measurement is a distance measurement with subsequent differentiation by time.

To measure angular velocity or speed, it is known to arrange several signal sources, which are monitored by sensors during the rotation, in a ring shape on a rotating element or system. The signal sources in this case can be, for example, gear wheel teeth which are evenly distributed along the periphery of a rotating system and which are monitored by inductive or optoelectronic means. During an interval in which a defined number of teeth is monitored on a partial or full periphery during rotation, a time reference signal is established. The speed is then computed from the number of counted teeth and the number of counted periods of the time reference signal, and the measurement can be repeated by counting the teeth and time reference signals.

The monitoring of the teeth and associated time reference signals is based on the averaging of multiple teeth for a speed measurement.

It is also known to determine speed from a single tooth signal and associated time reference signals. This type of speed measurement requires a high-speed processor, resulting in a commensurate cost increase.

In both methods, prior to the determination and output of an averaged speed value, a "dead time" results from the measuring time and the computation time of the speed measurement system. For some applications, this dead time is unacceptably long.

SUMMARY OF THE INVENTION

It is an object of the invention to provide an improved method of measuring speed such that the time difference between calculated speed values is reduced.

According to the invention, this objective is realized by a method for measuring rotational speed of a rotating element in a rotating system having a plurality of signal sources disposed on the element, according to which each signal source is detected to determine a time reference value based on a number of oscillator periods between each detection of each signal source, counting each signal source detected by the sensor. A signal sum N based on the counting of each signal source and an associated time reference values are saved in a storage medium. The time reference value of a first signal source which was saved exactly one revolution earlier is retrieved together with an associated signal sum from the storage medium, and the difference of the time reference values for the first signal source at first and second detections is calculated to compute the revolution time for one revolution of the rotating element. The reciprocal value of the revolution time is calculated to determine a first speed measurement of the speed of the rotating element. Further, speed measurements can be calculated according to the same process for other signal sources.

It is particularly advantageous that the time reference values associated with a signal source for speed measurement are monitored both before and after a revolution, so that the most accurate measurement is performed.

Another remarkable advantage is that the speed measurement is independent of the measuring time, since only the computation time determines the waiting time between two consecutive speed values in the method according to the invention.

BRIEF DESCRIPTION OF THE DRAWINGS

The present invention can be more fully understood upon reading the following Detailed Description of the Preferred Embodiments in conjunction with the appended drawings, in which:

FIG. 1 is a schematic diagram of a speed measuring system connected to a sensor according to an embodiment of the present invention.

It will be appreciated that only those elements that are essential for understanding the invention are shown. Detailed, in-depth description of each individual component is not provided, because the components are sufficiently known.

DETAILED DESCRIPTION OF THE PREFERRED EMBODIMENTS

Referring now to FIG. 1, a clockwise rotating element 1 has a periphery equipped evenly with signal sources 2–9. The signal sources 2–9 in this example consist of low-retentivity teeth which generate speed signals in a sensor 10 when the shaft 1 rotates. The sensor 10 preferably consists of an induction coil.

The speed signals generated by sensor 10 are counted by a counter 15 connected to the sensor 10, and the counted number of speed signals is transmitted in the form of a speed signal sum N to a connected storage medium 11. The storage medium 11 is also connected via a second counter 16 to a high-frequency oscillator unit 12, and because of this the storage medium 11 receives time reference signals $A_N$ simultaneously with the speed signal sums N. Thus, for each tooth 2–9 monitored by the sensor 10, or with each speed signal, a speed value sum N and an associated time reference value $A_N$ is saved.

For purposes of explanation only, the following are assumed:

1. A total number of M=8 low-retentivity teeth 2, 3, 4, 5, 6, 7, 8, and 9 are disposed along the periphery of the rotating shaft 1;
2. The oscillator unit 12 has a clock frequency of approximately 4 MHz, corresponding to a period of a τ=250 ns.
3. The rotating shaft 1 rotates at a speed of approximately 3,000 rpm or 50 rps.

When shaft 1 rotates, tooth 2 passes the sensor 10, and the counter 15 assigns an integer value that is transmitted as speed signal sum N to the storage medium 11. At the same time, the counter 16 records the integer number of complete periods of the oscillator unit 12 until the tooth 2 has passed the sensor 10. The speed signal sum and time reference number (N, $A_N$) will be saved by the storage medium 11 in pairs. The values (N+1, $A_{N+1}$) for the next tooth 3 passing the sensor 10 are also saved in storage medium 11. This series is continued for each subsequent tooth passing the sensor 10. The paired values (N+7, $A_{N+7}$) are saved for the last tooth 9 in a complete revolution, and the paired values (N+M, $A_{N+M}$) are saved for the following tooth 2 starting the next revolution.

3

The paired values are saved automatically and independently for future use, and, the storage capacity of storage medium 11 is preferably such that at least the associated value pairs of all the teeth of a complete revolution, including the next value pair, can be stored. The storage medium 11 is preferably a cyclic storage system in which the newest value pin in each case overwrites the oldest value pair.

In order to determine the speed, processor 13 connected to the storage medium 11 reads two value pairs, that is those of a tooth before and after a single revolution of the shaft 1. For example, the processor 13 reads value pairs (N+M, $A_{N+M}$) and (N, $A_N$) of tooth 2 from storage medium 11.

Processor 13 then performs the subtraction $A_{N+M}-A_N$, which yields 80,000 as an example.

This difference $A_{N+M}-A_N=80,000$ represents the number of complete periods of the oscillator 12 counted during a complete shaft revolution in the above embodiment. Processor 13 computes the difference of the time reference values $A_{N+M}, A_N$, and multiplies this difference by the period τ=250 ns of the oscillator unit 12 to determine a revolution time $T_U$ of the shaft 1, which in this example is:

$$T_U = 80,000 * \tau 32\ 80,000 * 250\ ns = 0.02\ s$$

Processor 13 then determines the reciprocal value of the revolution time $T_U=0.02$ s, which results in a speed of 50 rps or 3,000 rpm. This value is output to output unit 14.

A speed measurement for each additional tooth passing the sensor 10 can be performed substantially identically to the above-described speed determination method. This method for determining speed is characterized by a relatively short determination time. The determination time here is independent of the comparatively long registration and storage of the value pairs for the individual teeth. As a result, the determination time is defined only by the computation time of processor 13, plus the time for data communication between the storage unit 11 and processor 13. Each new speed signal generated by sensor 10 enables a newly computed speed value to be generated every 2.5 ms, and each computation is based on a full shaft revolution of 20 ms.

At the same time, the most accurate measurement is achieved from value pairs of a tooth before and after a single revolution with this method of speed determination.

It will be appreciated that the invention is not limited to the exemplary embodiment shown and described. For example, oscillator unit 12 may have a different period, and shaft may rotate slower or faster. Different signal sources and sensors can also be used. Further, speed values can be computed using any desired value pairs (N, $A_N$) of the signal sources.

While the foregoing description includes many details and specificities, it is to be understood that these are provided for illustrative purposes only, and are not to be construed as limitations of the invention. Numerous modifications to the disclosed embodiments will be readily apparent to those of ordinary skill in the art which do not depart from the spirit and scope of the invention, as defined by the following claims and their legal equivalents.

What is claimed is:

1. A method for measuring rotational speed of a rotating element having a plurality of signal sources disposed thereon, comprising the steps of:

a) detecting each signal source to determine a time reference value based on a cumulative total number of oscillator periods for each detection of each signal source;

b) counting each signal source detected by the sensor;

c) saving a signal sum N based on the counting of each signal source and an associated time reference value in a storage medium;

d) retrieving the time reference value of a first signal source which was saved for a previous revolution together with an associated signal sum from the storage medium;

e) calculating the difference of the time reference values for the first signal source at first and second detections to compute the revolution time of the rotating element; and f) calculating the reciprocal value of the revolution time to determine a first speed measurement of the speed of the rotating element.

2. The method of claim 1, further comprising the step of:

determining a second speed measurement for a second signal source according to steps d)–f).

3. The method of claim 1, wherein the previous revolution is an immediately preceding revolution.

4. The method of claim 1, wherein the sensor is an induction coil.

5. The method of claim 1, wherein the storage medium has a storage capacity sufficient to store signal sums and associated time reference values for at least one more than a total number of signal sources in a complete revolution of the rotating element.

6. The method of claim 5, wherein the step of saving further includes overwriting the oldest signal sum N and its associated time reference value with the newest signal sum N and its associated time reference value in the storage medium when the storage capacity of the storage medium is full.

7. A system for measuring rotational speed of a rotating element having a plurality of signal sources disposed thereon, comprising:

means for detecting each signal source to determine a time reference value based on a cumulative total number of oscillator periods for each detection of each signal source;

means for counting each signal source detected by the sensor;

means for saving a signal sum N based on the counting of each signal source and an associated time reference value in a storage medium;

means for retrieving the time reference value of a first signal source which was saved for a previous revolution together with an associated signal sum from the storage medium;

means for calculating the difference of the time reference values for the first signal source at first and second detections to compute the revolution time of the rotating element; and means for calculating the reciprocal value of the revolution time to determine a first speed measurement of the speed of the rotating system.

8. The system of claim 7, further comprising:

means for determining a second speed measurement for a second signal source.

9. The system of claim 7, wherein the previous revolution is an immediately preceding revolution.

10. The system of claim 7, wherein the sensor is an induction coil.

11. The system of claim 7, wherein the storage medium has a storage capacity sufficient to store signal sums and associated time reference values for at least one more than a total number of signal sources in a complete revolution of the rotating element.

12. The system of claim 11, wherein the storage medium is a cyclic storage system.

13. The system of claim 12 further comprising means for overwriting the oldest signal sum N and its associated time reference value with the newest signal sum N and its associated time reference value in the storage medium when the storage capacity of the storage medium is full.

* * * * *